United States Patent Office 3,156,701
Patented Nov. 10, 1964

3,156,701
PRODUCTION OF OXACYCLOALKANES FROM ALKYLENE HALOHYDRINS
Albert L. Rocklin, Walnut Creek, Calif., assignor to Shell Oil Company, New York, N.Y., a corporation of Delaware
No Drawing. Filed May 14, 1962, Ser. No. 194,647
5 Claims. (Cl. 260—333)

This invention relates to a novel and improved process for the preparation of cyclic ethers. More particularly, it relates to an improved process for preparing oxetanes in higher yield than has been possible to obtain heretofore.

INTRODUCTION

Cyclic ethers are well known as useful organic intermediates and as solvents and plasticizers. A particularly useful class of the ethers are those four-menbered ring compounds including a single oxygen atoms; these compounds are generally referred to as oxetanes or oxacyclobutanes.

A variety of methods are known for preparing such compounds. The principal method employed is the dehydrohalogenation of appropriate 1,3-halohydrins, see, for example, Reboul, Ann. [5], 14, 496 (1878); the dehydrohalogenation is effected by the action of caustic in aqueous phase. Ring closing of haloacetates to produce oxetanes was shown by Allen et al., JACS 56, 1398–1403 (1934). Dehydration of 1,3-diols by mixing them with concentrated sulfuric acid and adding the mixture to hot aqueous caustic while taking the product ether off overhead is taught by the patent to Case et al., U.S. 3,006,926, issued October 31, 1961.

These methods, however, are characterized by comparatively low yields of product cyclic ethers on the order of 50% or less. In order to provide a commercially feasible process, higher ether yields should be afforded.

OBJECTS

It is an object of the invention to provide an improved process for preparing cyclic ethers. Another object is the provision of a process for preparing cyclic ethers from alkylene chlorohydrins in high yield. Another object is the provision of an economical process for preparing oxetane from trimethylene halohydrin. Other objects will be apparent from the following detailed description of the process of the invention.

STATEMENT OF THE INVENTION

These objects are accomplished by the process which comprises reacting together an alkali metal hydroxide and an alkylene halohydrin wherein the halogen and hydroxyl groups are separated by at least three carbon atoms, in anhydrous tertiary alkanol.

PROCESS

The process of the invention is conducted in substantially anhydrous liquid phase and preferably at elevated temperature. While temperatures below about the boiling temperature of the reaction mixture may be employed, it has been observed that in tert-butyl alcohol and other similar solvents lower yields of product are obtained thereby. For this reason, it is preferred that the reaction be conducted at the boiling temperature of the solvent. Best results are obtained by conducting the reaction at a temperature from above about 80° C. to about 100° C. In general the process is most conveniently conducted at atmospheric pressure, and the boiling temperature referred to is that at or about normal atmospheric pressure. Superatmospheric or subatmospheric pressure may, however, be employed.

*Alkali metal hydroxide.*—By alkali metal hydroxide is meant those hydroxides of the formula M—OH where M is a monovalent atom of an alkali metal. Preferred alkali metal hydroxides are those of potassium and sodium. The hydroxide employed may be in the form of lumps or pellets or in the form of powder. Alternatively, the hydroxide may be added as a solution in the anhydrous tertiary alkanol solvent used in the reaction. Amounts of hydroxide required are at least one mole of hydroxide per mole of halohydrin reacted; a slight molar excess of the hydroxide is convenient to employ.

*Alkylene halohydrin.*—The alkylene halohydrin of the invention is that halohydrin consisting of a saturated hydrocarbon aliphatic chain to which are directly connected a halogen atom and a hydroxyl group, the chain carbon atoms to which said substituents are connected being separated by at least one intervening chain carbon atom. Such compounds have the general structure.

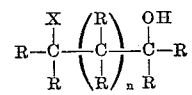

where each R is selected from the group consisting of hydrogen and alkyl and phenyl radicals and $n$ is a positive integer. The preferred alkylene halohydrins of the invention are those wherein each R is hydrogen, the halogen and hydroxyl groups thus being on the terminal carbon atoms of the chain. Particularly preferred compounds are those wherein the terminal carbon atoms of the chain, to which the halogen and hydroxyl groups are attached, are primary. Best results are obtained with alkylene halohydrins wherein R is hydrogen or alkyl of up to four carbon atoms, while in the most preferred embodiment of the invention $n$ is 1.

The substituent X on the halohydrin chain represents a halogen atom, preferably chlorine, since chlorohydrins are the least expensive members of the halohydrin class. Bromohydrins, while more expensive, are the most reactive halohydrins. Prefered halohydrins are those having from 3 to 10 carbon atoms in the molecule.

Representative halohydrins are such, 1,3-halohydrins as trimethylene bromohydrin, 1-chloro-2-methyl-3-hydroxypropane, 1-chloro-2-phenyl-3-hydroxypropane, and 1-iodo-2,2-diethyl-3-hydroxypropane. Of the 1,3-halohydrins, the preferred embodiment is trimethylene chlorohydrin.

Other halohydrins which may be employed include 2-chloro-4-hydroxypentane, 1-bromo-3-hydroxybutane, 1-chloro-4-hydroxypentane, 1-bromo-2-ethyl-3-hydroxypentane, 3-iodo-5-hydroxyheptane, 2-methyl-2-hydroxy-4-methyl-4-chloropentane. A particularly useful class of reactants are the primary halo-substituted alkanols. These are extremely reactive because of the reactivity of the terminal hydroxyl group. Typical haloalkanols include 3-chlorobutanol, 3-chloro-2-methylbutanol, 3-bromopentanol, 3-chloro-2,2-dimethylpentanol, and the like. Preferred alkanols are those of up to 8 carbon atoms wherein the halogen atom is separated from the terminal hydroxyl by at least 3 carbon atoms, and preferably from 3 to 5 carbon atoms.

*Solvent.*—Conventionally, the dehydrohalogenation of alkylene halohydrins has been conducted in aqueous solution. Surprisingly, however, it has been found that materially better yields of cyclic ethers are achieved when the reaction is conducted in a substantially anhydrous inert solvent.

Of the solvents examined, best results were obtained with tertiary alkanols. Such compounds are those alcohols wherein the hydroxyl group is connected to a carbon atom whose remaining valences are satisfied with other carbon atoms. Exemplary compounds art tertiary amyl alcohol, tertiary hexyl alcohol, tertiary octyl alcohol, and the like. Preferred alkanols are those having from 4 to 8 carbon atoms, while the most preferred alkanol is tertiary butyl alcohol because of its low cost and desirable physical properties.

Sufficient alkanol solvent is employed in the process of the invention to maintain the reactants in dilute liquid phase. Reaction systems containing up to about 40% w. of the halohydrin are preferred, while best results are obtained if the range of halohydrin in the reaction system is between above 1–10% w.

PROCEDURE

The process of the reaction may be conducted in a batch, semi-batch or continuous manner and the reactants may be added in any convenient order. For example, excellent yields of cyclic ethers are obtained when trimethylene chlorohydrin is added to a refluxing mixture of tertiary butyl alcohol containing solid KOH pellets. Alternatively, solutions containing dissolved hydroxide and dissolved halohydrin may be added to one another; or the hot halohydrin solution in tertiary alkanol passed over solid caustic. A preferred method is to add the chlorohydrin and the caustic to the solvent at such a rate that the concentrations of these two reagents remain low.

PRODUCTS

The cyclic ether products obtained by the practice of the invention are those oxacycloalkanes of the structure

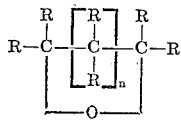

where R and $n$ have the above significance. Preferred products are the oxetanes, those cyclic ethers obtained when $n$ is 1.

Representative cyclic ether products are such oxetanes as oxetane itself, the monoalkyl oxetanes such as 2-methyloxetane, 2-ethyloxetane and 3-methyloxetane; the dialkyloxetanes including 3,3-dimethyloxetane, 2,4-diethyloxetane, and 2,3-dimethyloxetane; and the trialkyloxetanes, including 2,3,4-trimethyloxetane, 2,3,3-trimethyloxetane, and 2,3,4-trimethyloxetane, as well as the phenyloxetanes such as 2-phenyloxetane.

Other typical cyclic ethers which can be prepared by the method of the invention are tetrahydrofuran, 2,2,5,5-tetramethyl-tetrahydrofuran and tetrahydropyran, and their alkyl-substituted homologs.

The novel and improved features of the process of the invention are illustrated by the following examples. It should be understood, however, that the examples are merely illustrative and are not to be regarded as limitations to the appended claims, since the basic teachings thereof may be varied at will as will be understood by one skilled in the art. In the examples, the proportions are given in parts by weight unless otherwise noted.

*Example I*

A mixture of 25 g. powdered KOH, 125 ml. tert amyl alcohol and 23.88 g. 3-chloropropanol was stirred at about 95° C. while boiling out the more volatile fraction. In this way about 4.21 g. of oxetane was obtained.

*Example II*

A mixture of 25 g. powdered KOH and 100 ml. tert. butanol was refluxed with rapid stirring and 22.17 g. 3-chloropropanol was added over a two-hour period. At the end of that time the mixture was cooled and volatile material flashed off at room temperature under reduced pressure. In this way about 9.1 g. (66.8% yield) of oxetane was obtained.

*Example III*

An aqueous solution of 71 g. 85% KOH pellets in 30 ml. water was prepared. This solution was stirred at 80° C. with 50 ml. tert. butanol under nitrogen and full reflux. To this mixture, 27.6 g. 3-chloropropanol was added over a 3-hour period, and the mixture was cooled one-half hour later, and the organic layer decanted off.

The aqueous phase was filtered to remove precipitated solids and the organic portion thereof combined with the decanted liquid. The combined alcohol phase was then flashed at room temperature and the oxetane determined by quantitative infrared analysis.

In this way about 6.3 g. of oxetane (37% yield) was obtained.

*Example IV*

A series of experiments were run employing a solution of 2.8% w. of dry KOH in solution in anhydrous tert. butanol. In these experiments, 3-chloropropanol was added to a reflux 50 ml. portion of the solution. The results of these experiments are set forth in Table I below. In these experiments, the chlorohydrin was added all at once except where otherwise noted. The oxetane was determined by gas chromatography.

TABLE I

| Temp., °C. | Mol Ratios | | | Time, Hr. | Yield, Percent | Remarks |
|---|---|---|---|---|---|---|
| | KOH | Chlorohydrin | H₂O | | | |
| 80 | 1 | 0.78 | | ¾ | 62.9 | |
| 80 | 1 | 0.78 | | 2 | 60.4 | Chlorohydrin added slowly. |
| 80 | 1 | 0.78 | 4.2 | 2½ | 30.5 | Second aqueous phase. |
| 60 | 1 | 0.78 | | 2½ | 52 | |
| 80 | 1 | 0.47 | | 1 | 75.8 | |
| 80 | 1 | 0.47 | | 1¾ | 73.5 | Chlorohydrin added slowly. |
| 80 | 1 | 0.48 | 0.48 | 2 | 59.5 | Homogeneous. |
| 60 | 1 | 0.47 | | 2¾ | 51.2 | |

From these data, three conclusions can be drawn:

(1) Water reduces the yield.

(2) Lowering the temperature from 80° to 60° reduces the yield.

(3) Low concentration or low chlorohydrin: KOH ratios favor high yields.

*Example V*

Using the methods of the previous examples, the following cyclic ethers are readily prepared from the noted halohydrins.

| Halohydrin | Ether | B.P., °C. |
|---|---|---|
| 3-chloro-2,2-dimethyl propanol | 3,3-dimethyloxetane | 79.5–80 |
| 3-bromo-2,2-diethyl propanol | 3,3-diethyloxetane | 138–140 |
| 3-chlorobutanol | 2-methyloxetane | 60–61 |
| 3-chloro-2-methyl butanol | 2,3-dimethyloxetane | 85–86 |
| 3-chloro-2-ethyl hexanol | 3-ethyl-2-propyloxetane | 155 |
| 3-chloro-2,3-dimethylbutanol | 2,3,3-trimethyloxetane | 99–100 |
| 4-chlorobutanol | tetrahydrofuran | 64–66 |
| 5-chloropentanol | tetrahydropyran | 158 |
| 1-phenyl-3-chloropropanol | 2-phenyloxetane | 81 (4 mm.) |

*Example VI*

Using the technique of Example I, 1.01 g. of 3-chloropropanol was added over a period of 1¾ hours to anhydrous slurry of 3 g. of NaOH in 60 ml. anhydrous tert. butanol, the mixture being maintained at 80° C.

Workup of the resulting mixture by gas chromatography gave a 63.3% yield of oxetane.

*Example VII*

Fifty grams of 3-chloropropanol was slowly added over an 8-hour period to an 80° C. anhydrous mixture of 150 ml. of tert. butanol containing 51 g. of sodium hydroxide.

Workup of the resulting mixture and analysis thereof by infrared spectroscopy and by gas chromatography showed a 45% yield of oxetane.

*Example VIII*

Using the techniques of the previous examples, 3-bromopropanol was added over a half-hour period to anhydrous solutions of sodium hydroxide in tert. butanol. The resulting data are set forth below.

| Temperature, ° C. | NaOH/Bromo-hydrin Molar ratio | Yield of Oxetane |
|---|---|---|
| 80 | 1:0.47 | 64.5 |
| 60 | 1:0.47 | 66.1 |

I claim as my invention:

1. The process for preparing cyclic ethers which comprises reacting together
    an alkali metal hydroxide and
    an alkylene halohydrin of the formula

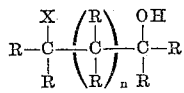

where each R is selected from the group consisting of hydrogen and alkyl of up to 4 carbon atoms and phenyl, $n$ is a positive integer such that the halohydrin contains from 3 to 10 carbon atoms and X represents halogen of the group consisting of chlorine and bromine, in anhydrous liquid phase in tertiary alkanol having 4 to 8 carbon atoms per molecule at the boiling temperature of the reaction mixture.

2. The process of claim 1 wherein the tertiary alkanol is tertiary butanol.

3. The process for preparing oxetane which comprises reacting together
    an alkali metal hydroxide and
    trimethylene chlorohydrin
in anhydrous tertiary alkanol having 4 to 8 carbon atoms per molecule at the boiling temperature of the reaction mixture.

4. The process for preparing oxetane which comprises adding trimethylene chlorohydrin
    to a refluxing mixture of
        alkali metal hydroxide and
        anhydrous tertiary butanol.

5. The process of claim 3, wherein the tertiary alkanol is tertiary amyl alcohol.

References Cited in the file of this patent

FOREIGN PATENTS

| 938,013 | Germany | Jan. 19, 1956 |
| 943,906 | Germany | June 1, 1956 |
| 797,276 | Great Britain | July 2, 1958 |

OTHER REFERENCES

Ponomarev et al.: "Chemical Abstracts," vol. 56, page 2435d, February 1962.

Forsberg: "Acta Chem. Scand.," vol. 8, pages 135–6 (1954).